(12) United States Patent
Foreman

(10) Patent No.: US 9,982,639 B2
(45) Date of Patent: May 29, 2018

(54) TUNABLE INJECTION MOLDED RESONATOR

(71) Applicant: RL Hudson & Company, Broken Arrow, OK (US)

(72) Inventor: Benny R. Foreman, Broken Arrow, OK (US)

(73) Assignee: RL Hudson & Company, Broken Arrow, OK (US)

( * ) Notice: Subject to any disclaimer, the term of this patent is extended or adjusted under 35 U.S.C. 154(b) by 331 days.

(21) Appl. No.: 14/823,377

(22) Filed: Aug. 11, 2015

(65) Prior Publication Data

US 2017/0045021 A1 Feb. 16, 2017

(51) Int. Cl.
*F02M 35/12* (2006.01)
*B29C 45/26* (2006.01)

(52) U.S. Cl.
CPC ....... *F02M 35/1283* (2013.01); *B29C 45/261* (2013.01); *B29C 45/2673* (2013.01); *F02M 35/1261* (2013.01); *B29C 2045/2677* (2013.01)

(58) Field of Classification Search
CPC ............ F02M 35/1283; F02M 35/1261; B29C 45/2673; B29C 45/261; B29C 2045/2677
See application file for complete search history.

(56) References Cited

U.S. PATENT DOCUMENTS

| | | |
|---|---|---|
| 5,624,518 A | 4/1997 | Stief et al. |
| 6,205,968 B1 | 3/2001 | Spannbauer |
| 6,935,461 B2 | 8/2005 | Marocco |
| 7,757,808 B1 | 7/2010 | Vaz et al. |
| 8,087,493 B2 | 1/2012 | Kempf et al. |
| 8,323,556 B2 | 12/2012 | Khami et al. |
| 8,327,975 B2 | 12/2012 | Ortman et al. |
| 8,617,454 B2 | 12/2013 | Khami et al. |
| 2010/0229817 A1* | 9/2010 | Hirai ................ F02M 35/10131 123/184.21 |
| 2016/0221295 A1* | 8/2016 | Roychoudhury ......... B32B 3/28 |

FOREIGN PATENT DOCUMENTS

| | | |
|---|---|---|
| JP | 01058530 A | 3/1989 |
| JP | 5346758 B2 | 8/2013 |

* cited by examiner

*Primary Examiner* — Moshe Wilensky
(74) *Attorney, Agent, or Firm* — David G. Woodral; Gable Gotwals

(57) ABSTRACT

A method including providing a mold cavity to produce an outer contour of an acoustic resonator and providing a mold core to produce an inner contour of the resonator. The inner contour corresponds to a plenum, and a connecting channel in fluid communication with the plenum. An insert fitting adjacent to the mold core defines a length of the connecting channel during injection molding of the resonator.

16 Claims, 7 Drawing Sheets

TUNABLE INJECTION MOLDED RESONATOR

FIELD OF THE INVENTION

This disclosure relates to intake resonators in general and, more specifically, to methods of manufacture and tuning of intake resonators.

BACKGROUND

Air intake pathways of engines and other machines may produce undesirable sounds during operation. In some cases an end user might desire to suppress as much sound as possible, while in other cases a user might desire that certain acoustic frequencies generated by the intake be accentuated.

Intake resonators are one solution to these issues. Typically a resonator does not substantially affect the volume or actual pathway of the intake air, but provides various acoustic chambers adjacent to the air flow path through which sound may travel and/or be reflected. The acoustic properties of the resonator may be chosen to accentuate desirable sounds in the intake or to suppress undesirable sounds.

An acoustic resonator must be tuned to a specific application. This means that when an application design (e.g., an intake pathway) changes even a slight amount, the resonator may need to be redesigned to provide its desired operation. Presently, this can mean an entirely new resonator design, with new tooling, molds, and assembly methods. Furthermore, current methods of resonator manufacturing (e.g., blow molding), do not provide as much control over the internal geometry of the resonator as may be desirable in certain resonator applications.

What is needed is a system and method for addressing the above, and related, concerns.

SUMMARY OF THE INVENTION

The invention of the present disclosure, one aspect thereof, comprises a method including providing a mold cavity to produce an outer contour of an acoustic resonator, and providing a mold core to produce an inner contour of the resonator. The inner contour corresponds to a plenum, and a connecting channel in fluid communication with the plenum. The method includes providing an insert fitting adjacent to the mold core that, during injection molding of the resonator, defines a length of the connecting channel.

The inner contour of the resonator may also correspond to an air intake portion forming part of an air intake path. At least a portion of the connecting channel may run immediately adjacent to the air intake portion.

The method may further comprising injection molding the resonator and installing it into an air intake path such that the connecting channel and the portion of an air intake path run adjacent to one another above a port between the two. The resonator may be closed with a flat panel or a contoured panel. A quantity of potting compound may be placed into the plenum to alter its volume.

The invention of the present disclosure, in another aspect thereof, comprises a method including providing a mold cavity, a mold core, and a mold insert that together define a part impression corresponding an integrated acoustic resonator, the integrated acoustic resonator having: a portion of an air intake; a plenum; and a connecting channel in fluid communication with portion of the connecting channel and the plenum. The method includes injection molding the integrated acoustic resonator with the mold insert adjacent to the mold core to define a length and location of the connecting channel. A resonant frequency of the integrated acoustic resonator is selected by adjusting a length of the mold insert corresponding to the length of the connecting channel. In some embodiments, at least a portion of the connecting channel runs parallel to the pair intake portion.

The method may further comprise installing the integrated acoustic resonator into an air intake path such that a port defined between the connecting channel and the portion of an air intake is situated such that the connecting channel proceeds upwardly from the connection. The method may include placing a quantity of potting into the resonator to alter a volume of the plenum and/or sealing a flat or contoured panel to the integrated acoustic resonator.

The invention of the present disclosure, in another aspect thereof, comprises injection molding a plenum of an integrated resonator between a mold cavity and a mold core, injection molding a portion of an air intake path between the mold cavity and the mold core as a component of the integrated resonator, and injection molding a connecting channel between the mold cavity and a mold insert adjacent to the mold core, as a component of the integrated resonator, the connecting channel providing fluid communication between the plenum and the air intake portion.

The method may include arranging the air intake path portion and the connecting channel to run at least partially parallel to one another from a common opening between the two. The method may also include installing the integrated resonator into an air intake path of a machine such that the common opening between the air intake path portion and the connecting channel is below where the air intake path portion and the connecting channel run parallel to one another. A quantity of filler may be placed into the plenum such that the volume of the plenum is reduced by the filler. The method may include sealing the air intake portion, the plenum, and the connecting channel with a flat panel or a contoured panel.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
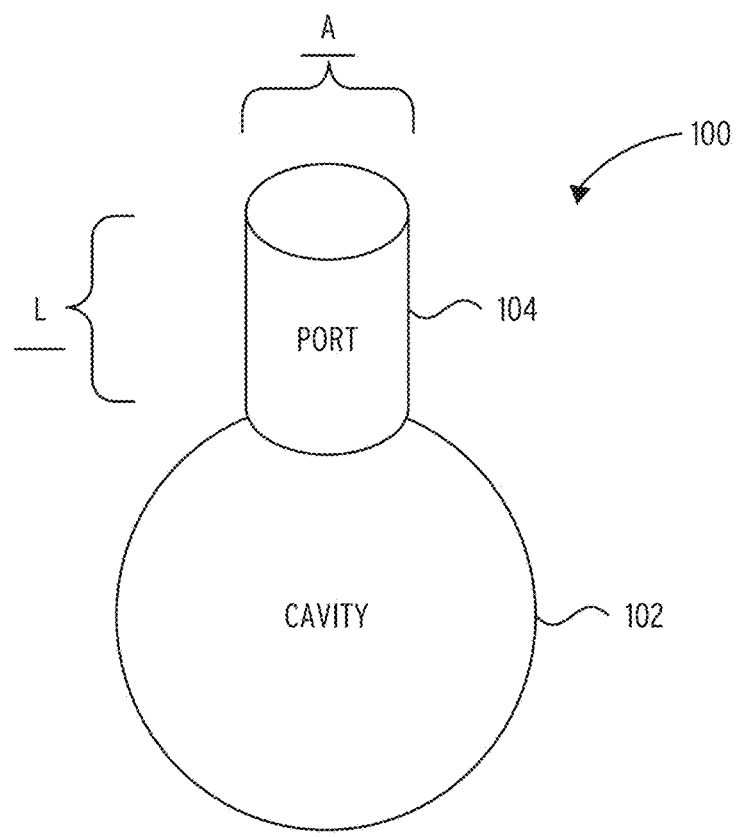
FIG. 1 is a schematic diagram of a Helmholtz resonator.

Referring now to FIG. 1 a schematic diagram of a Helmholtz resonator 100 is shown. An air cavity 102 with a connecting channel or port 104 exhibits a single resonant frequency known as the Helmholtz resonant frequency. The resonant frequency is related to a volume V of a cavity 102 of the resonator 100 and to a cross sectional area A and length L of the port 104 by the relationship described in the equation:

$$f = \frac{v}{2\pi}\sqrt{\frac{A}{VL}},$$

where f is the resonant frequency and v is the speed of sound. Accordingly, a Helmholtz resonator may be tuned (within a range of values) by altering only one of the volume V, length L, of area A. Additionally, the port 104 need not necessarily travel via a straight pathway into the cavity 102 in order for the relationship described above to hold true.

Figure 2:
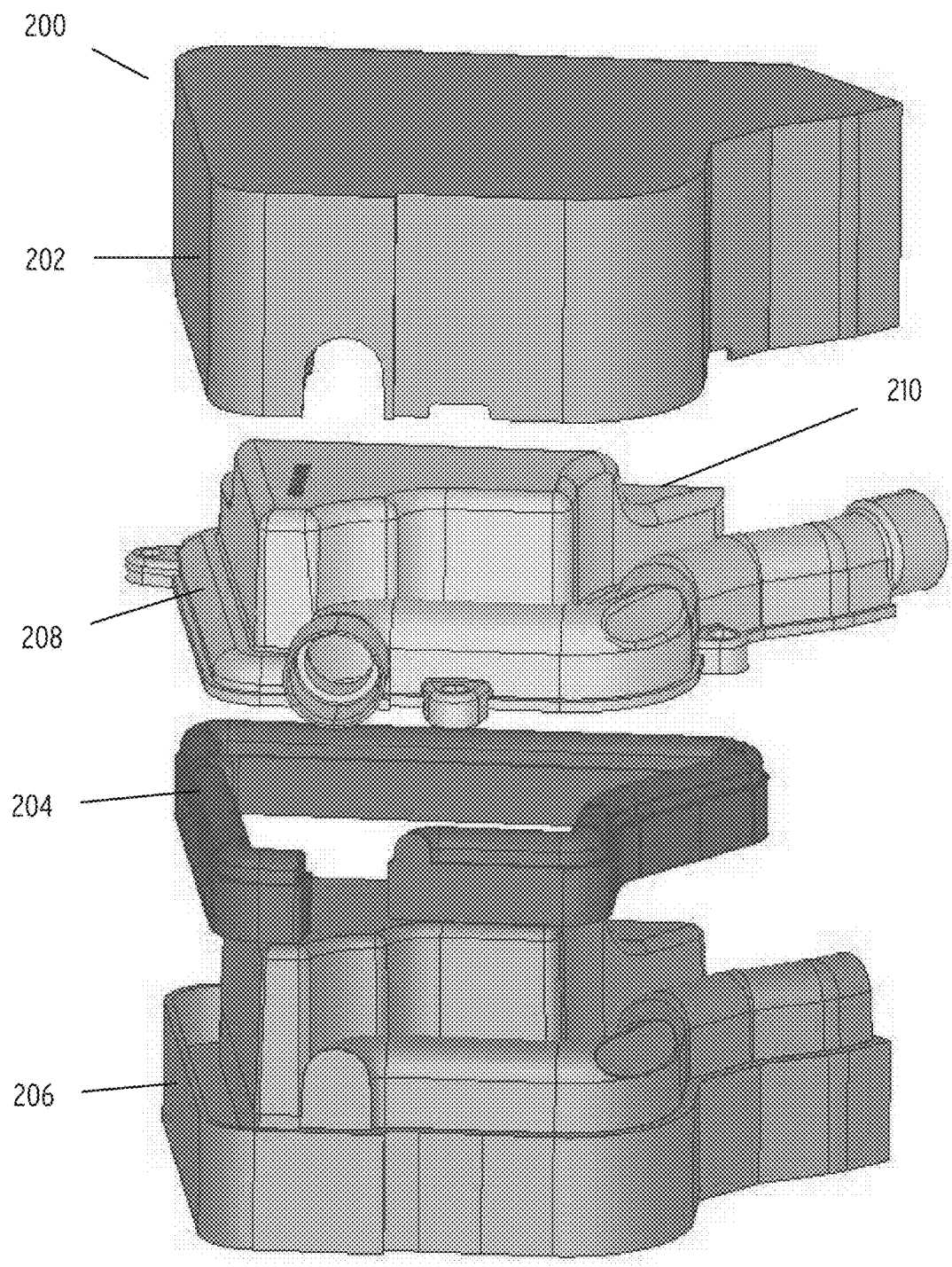
FIG. 2 is an exploded perspective view of a mold assembly according to aspects of the present disclosure.

Referring now to FIG. 2 an exploded perspective view of a mold assembly 200 according to aspects of the present disclosure is shown. The mold assembly 200 includes a mold cavity 202, an insert 204, and a mold core 206. The components operate together to produce a resonator 208, which operates according to the principles of a Helmholtz resonator as described previously.

The mold assembly 200 is an injection molding assembly. The raw materials that are ultimately formed into the resonator 208 are injected under pressure into the mold form defined as the space between the mold cavity 202 on one side, and the insert 204 and mold core 206 on the other side. In the present view, the outer contour 210 or outer shape of the resonator 208, is visible. The outer contour 210 is formed by the mold cavity 202. Injection molding provides a greater degree of tunability and control over the shape (both inside and out) of the completed product—in this case resonator 208. Precise control of geometry and dimension are important where, like here, the performance characteristics depend ultimately upon the shape of the final product.

Figure 7:
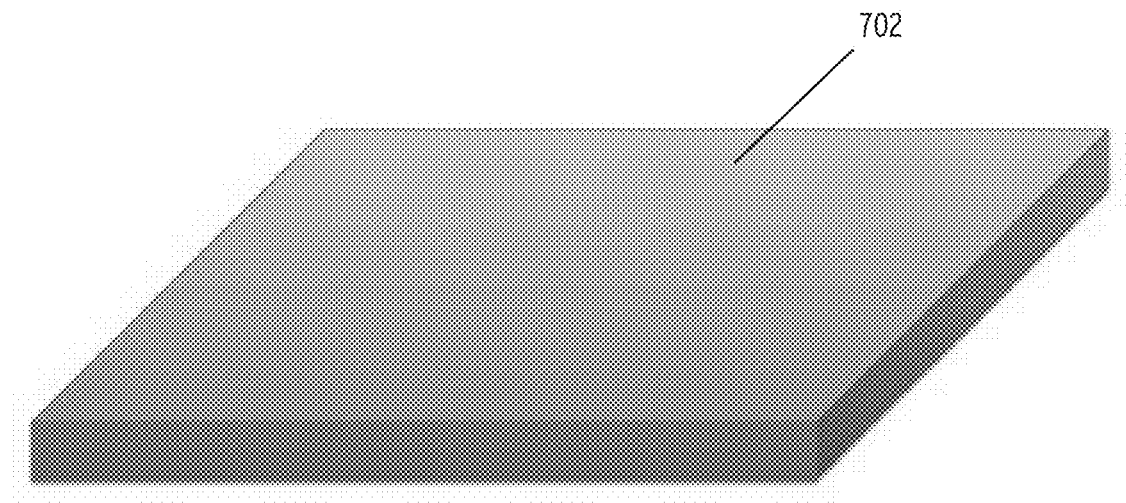
FIG. 7 is a perspective view of a panel for closing a resonator according to aspects of the present disclosure.

In the present embodiment, the mold assembly 200 produces the resonator 208 as a shell having the major components of a Helmholtz resonator together in an integrated package. It will be appreciated that the mold assembly 200 does not simultaneously produce an opposite shell to seal and complete the resonator 208. The resonator 208 has been designed such that the device may be completed by a single lower plate or panel 702 (FIG. 7) to seal and isolate the respective cavities of the resonator 208. The panel 702 may be cut or molded from a polymer compatible with the injection molding of resonator 208. The panel 702 may be molded or trimmed to fit the outline of the resonator 208 if desired. A sealing material or gasket may be used between the resonator 208 and panel 702 if needed. In another embodiment, the resonator is closed off into the respective cavity and channel by affixing the resonator 208 to a flat surface associated with a machine where the resonator 208 is employed.

As described in greater detail below, the insert 204 nests with the mold core 206 (immediately adjacently) during injection molding of the resonator 208 and determines the length of the connecting channel. This means to produce a resonator of a different resonate frequency, the mold assembly 200 needs only a different insert that defines a connecting channel of a different length. In this way, the mold assembly 200 is utilized to produce a wide variety of resonators tuned for different specific applications based on alteration of a part impression defined by the mold cavity 202 on one side, and the mold core 206 and mold insert 204 on the other side.

Figure 3:
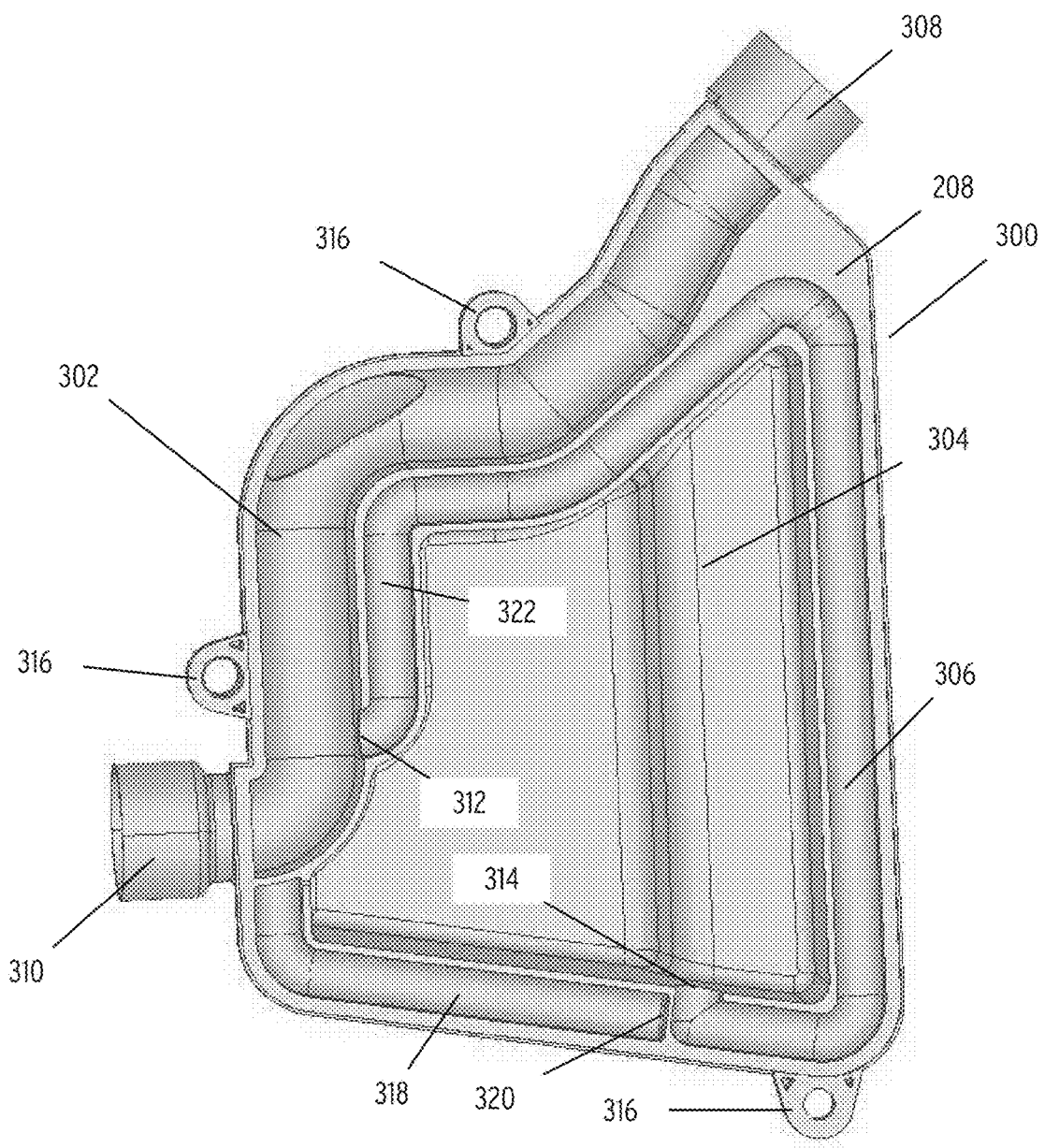
FIG. 3 is an inferior plan view of a resonator according to aspects of the present disclosure.

Referring now to FIG. 3, an inferior plan view of the resonator 208 according to aspects of the present disclosure is shown. The viewpoint of FIG. 3 illustrates an inner contour 300 or inner shape of the resonator 208. The inner contour is formed by the combination of the mold core 206 and insert 204.

The resonator 208 is to be incorporated into the air intake of an internal combustion engine or other device that draws air in through an intake path. Accordingly, the resonator 208 includes an air intake portion 302. This may be connected inline with the rest of the air intake of the associated engine, which may include various filters, valves, intercoolers, etc.

As mentioned above, the resonator 208 is based on the principles of a Helmholtz resonator. Here a plenum 304 is defined in the resonator 208 and is partially surrounded by a connecting channel 306 (which corresponds to the port 104 of FIG. 1). The connecting channel 306 might take any path from the plenum 304 to an opening or port 312 without disrupting the operating principles of a Helmholtz resonator but is wrapped around the plenum 304 in the present embodiment to conserve space both in the mold assembly 200 and in regards to the operating space of the associated machine to which the resonator 208 is installed.

The connecting channel 306 provides an acoustic pathway between the air intake portion 302 and the plenum 304. The connecting channel 306 opens to the air intake portion 302 at port 312 and opens into the plenum 304 at port 314. In some embodiments, the location of the port 312 will be held constant for reasons explained below. The location of the port 314, that is where the connecting channel 306 terminates into the plenum 304 can be made to vary from one individual injection molded resonator to the next in order to tune the resonant frequency.

It can be seen that there is additional space around the plenum 304 that is not occupied by the connecting channel 306 (although some of this space might be occupied for those embodiments tuned to a lower resonant frequency). Since the resonant frequency may be tuned by varying only the insert 204, and in order to use an identical mold cavity 202 and mold core 206 for a wide variety of resonant frequencies the insert 204 may provide for creation of an unused channel 318 that is separated or wall off from the connecting channel 306 by a transverse wall 320. The transverse wall 320 may be adjacent to the port 314 and form a portion of the effective length of the connecting channel 306. The unused channel 318 may be molded to be hollow to save weight and materials as it has no effect on the operation of the resonator 208.

Following injection molding, an intake fitting 308 may be affixed (or cut or machined as part of the molded resonator 208) to the air intake portion 302. An output fitting 310 may likewise be situated at the opposite end of the air intake portion 302. Fittings 308 and 310 may take any form used to connect one duct to another, including barbed hose connections, female tube joints (as shown) or any other suitable means. As discussed below, certain benefits may derive from installing the resonator 208 such that air flows through the air intake portion 302 from the intake fitting 308 and out through the output fitting 310.

A number of flanges 316 may be molded around the periphery of resonator 208. These may be sized to accept fasteners that connect the resonator 208 to a lower plate (not shown) that will separate or isolate the air intake portion 302, the connecting channel 306, and the plenum 304 from each other (except at ports 312, 314) and from outside air (except at intake fitting 308 and output fitting 310) to complete the resonator 208. Instead of a lower plate, the resonator 208 may also be attached to a stable flat surface already present at the location where the resonator 208 is to be installed. A sealing material, or a properly fitted gasket, may be employed to prevent air leaks wherever the resonator 208 is affixed as these could be detrimental to the performance of the resonator 208 or the machine onto which it is installed.

Air intakes on engines and other devices can frequently be prone to condensation owing to pressure differentials and changing temperatures. Excessive moisture in the plenum 304 and/or connecting channel 306 could alter the resonant frequency in unpredictable ways. Therefore, in addition to the connecting channel 306 wrapping partially around the plenum 304, the port 312 into the air intake portion 302 may be located at a low point relative to the immediately adjacent sections of pieces of air intake portion 302 and connecting channel 306. In this manner and condensation forming in the air intake path would be more likely to drain away from the connecting channel 306 and plenum 304 rather than flowing into these areas. It will be appreciated that in order to derive such a benefit from the disclosed design, the resonator 208 must be installed oriented as shown, that is with the intake fitting 308 situated above the output fitting 310.

Figure 4:
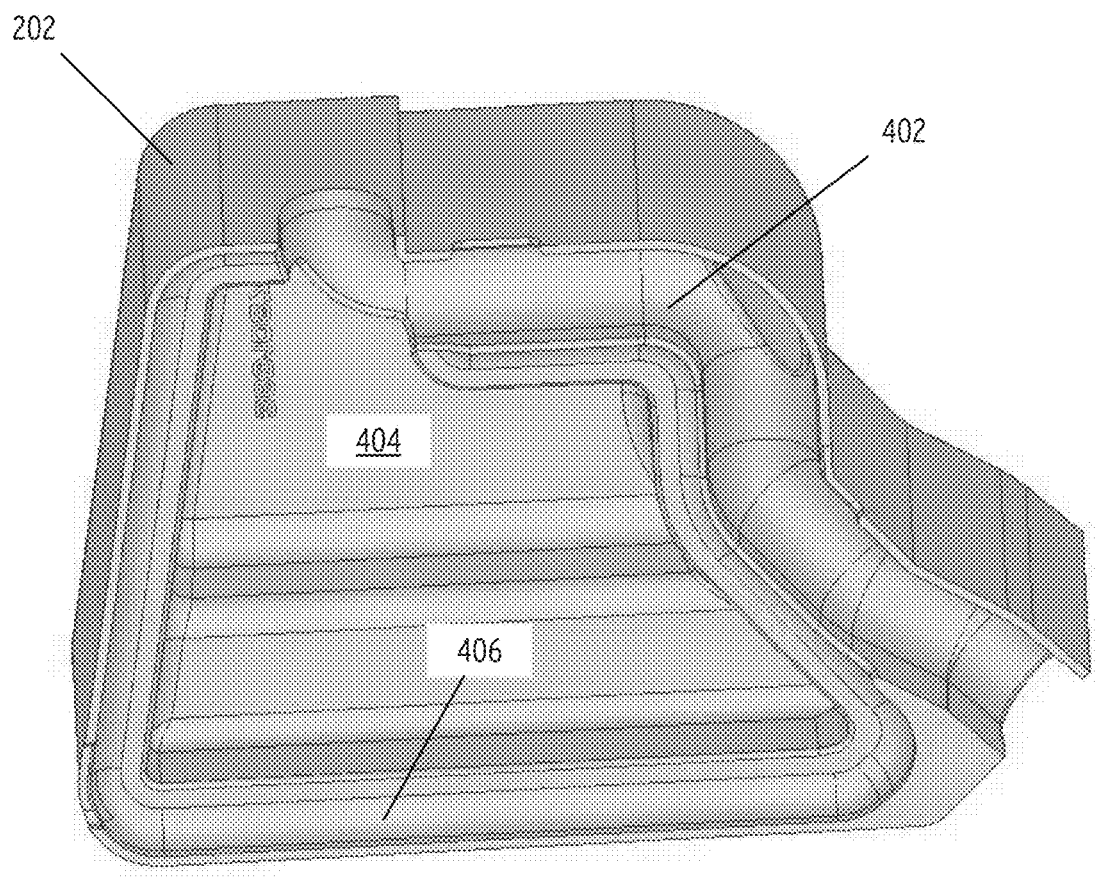
FIG. 4 is an inferior perspective view of a mold cavity according to aspects of the present disclosure.

Referring now to FIG. 4, an inferior perspective view of the mold cavity 202 according to aspects of the present disclosure is shown. It is the underside of the mold cavity 202, shown here, that produces the outer contour 210 of the resonator 208. The mold cavity 202 provides an air intake portion cavity 402 that corresponds to the air intake portion 302 of the resonator 208. A plenum cavity 404 is provided that corresponds to the plenum 304 of the resonator 208. A connecting channel cavity 406 is provided corresponding to the connecting channel 306.

It will be appreciated that the shape of the interior of the mold core 202 and, in fact, the shape of the outer contour 210 itself is not as critical to the resonant frequency and operation of the resonator 208 as the inner contour 300. The resonator 208 would operate regardless of the shape of the outer contour 210. Nevertheless, the outer contour 210, at least to some extent, defines the operating space into which the resonator 208 will fit. The resonator 208, being implemented for a particular machine or engine may have some restrictions on how large or heavy it may be. Additionally, differences in the shape of the outer contour 210 and inner contour 300 partially determine both the physical strength and durability of the resonator 208 as well as the amount of raw material required to construct each resonator 208. Accordingly, the mold core 206 may be constructed with these constraints in mind.

Figure 5:
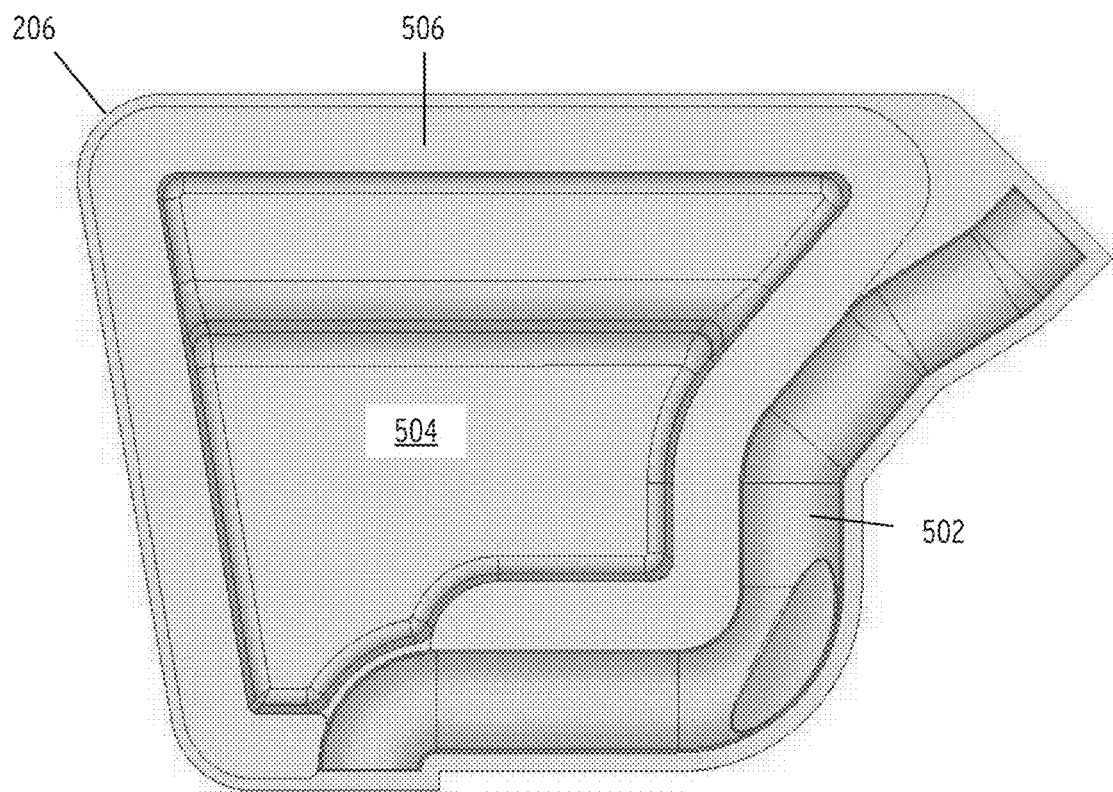
FIG. 5 is a plan view of a mold core according to aspects of the present disclosure.

Referring now to FIG. 5, a plan view of a mold core 206 according to aspects of the present disclosure is shown. The mold core 206 cooperates with the insert 204 to define the inner contour 300, which controls the resonant frequency of the resonator 208. The mold core 206 provides air intake portion core 502 to define the size, shape, and orientation of the air intake portion 302. The mold core 206 provides a plenum core 504 to define the size, shape, and orientation of the plenum 304.

As described previously, the length of connecting channel 306 determines the chosen resonant frequency of the resonator 208. The length of this component will be determined by the shape of the insert 204. Accordingly, the mold core 206, rather than defining the shape of the connecting channel 306, provides an insert shelf 506 against which the insert 204 is placed prior to the molding process.

Figure 6:
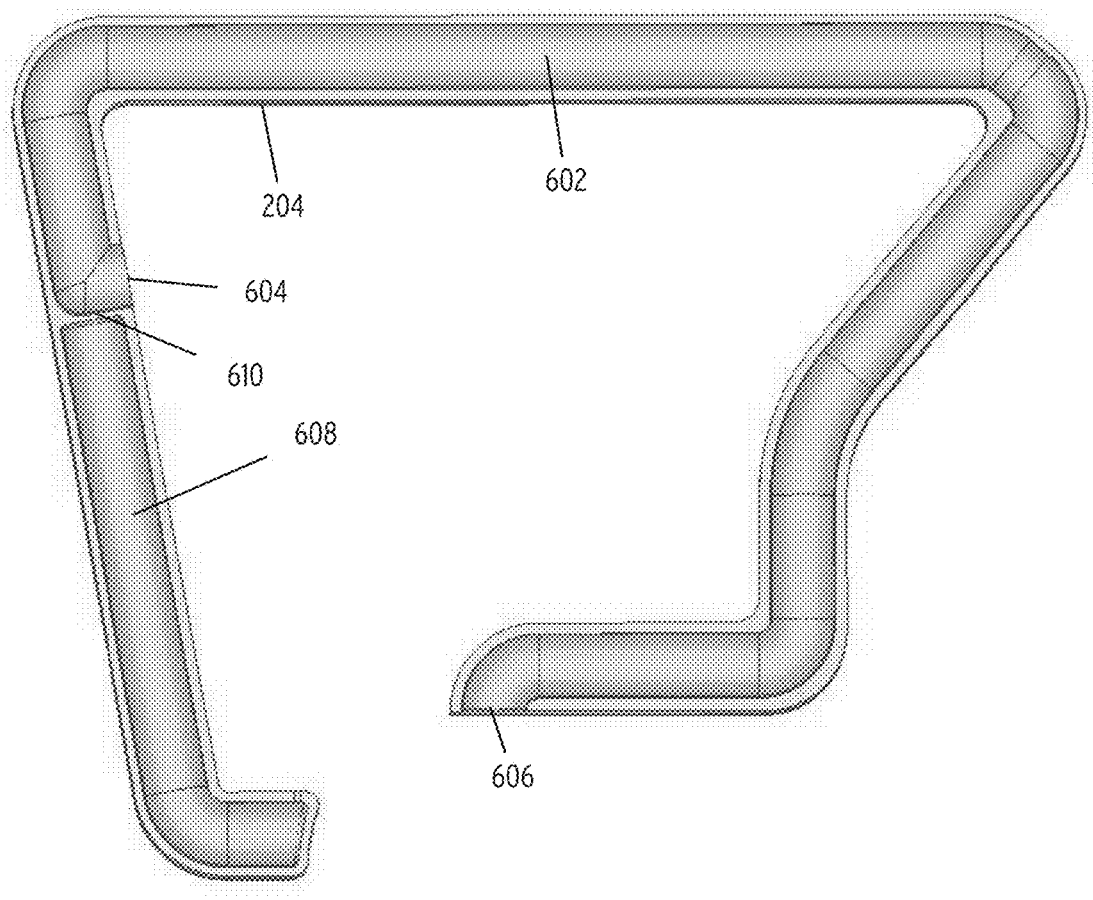
FIG. 6 is a plan view of a mold insert according to aspects of the present disclosure.

Referring now to FIG. 6, a plan view of the mold insert 204 according to aspects of the present disclosure is shown. The mold insert 204 fits onto insert shelf 506 of the mold core 206 as can be seen in the exploded view of FIG. 2. The insert 204 defines the inner contour 300 corresponding to the connecting channel 306.

The insert 204 provides a connecting channel insert 602 defines the length and location of the connecting channel 306. The connecting channel insert 602 has a length running between a terminus 604 and a terminus 606. The terminus 604 defines the location of the port 314 entering into the plenum 304 (as shown in FIG. 3). The terminus 606 defines the location of the port 312 connecting with the air intake portion 302 (FIG. 3). The cross section size of the connecting channel insert 602 will also largely determine the cross section area of the connecting channel 306 (presuming a flat bottom affixed over the channel). To an extent, this cross sectional area can be used to tune the resonant frequency as well, based upon the equation discussed with respect to FIG. 1. The cross sectional area of the connecting channel 306 may also be altered by the geometry of the panel 702 immediately adjacent to the connecting channel 306. The panel 702 may provide a contoured (e.g., convex or concave) area adjacent, or running parallel to, the connecting channel 306 that increases or decreases the effect cross sectional area.

An unused channel insert 608 is defined apart from the connecting channel insert 602 separated by wall gap 610. The size and shape of the unused channel insert 608 has no effect upon the operation of the resonator 208 when completed but may provide a shape that minimizes weight and materials consumed in the molding process.

It will be appreciated that a plurality of different inserts, similar to insert 204, could be utilized with the same set of components of the mold assembly 200. The inserts may be made to vary only in the length of the connecting channel insert 602 (though this may mean the location of the wall gap 610 and unused channel insert 608 may vary at least somewhat as well). This allows for easy tuning or retuning of the resonator being produced at the instant time by the associated mold assembly 200.

In addition to tuning by alteration of the insert 204, the resonant frequency of the completed resonator 208 can also be tuned by alteration of the volume of the plenum 304. This can be done post molding by applying potting compounds, stable fillers, or the like to the plenum 304, thereby reducing its volume. Based upon the governing equation of a Helmholtz resonator this will serve to decrease the resonant frequency, as does lengthening the connecting channel 306. However, the application of a potting compound can be employed after the resonator 208 is molded. It would generally be much more difficult to alter the length of the connecting channel 306 when the injection molding of the resonator 208 is complete.

As mentioned above, the back panel 702 can be utilized to aid in tuning the resonant frequency by altering the effective cross sectional area of connecting channel 306. The back panel 702 can also provide either a contoured (e.g., concave or convex) shape adjacent to the plenum 304 thereby altering its effective volume and, consequently, the resonant frequency.

It will be appreciated that those having skill in the art of injection molding will be able to properly locate injection nozzles, hoppers, heaters, screw conveyors, ejectors, and the like, relative to the systems illustrated by the present disclosure without undue experimentation. Accordingly, for simplicity, those have not been shown.

The materials that comprise the mold cavity 202, insert 204, and mold core 206 may be selected based upon the desired duty cycle and heat resistance properties needed for the polymer or polymers that will be employed in the injection molding process. In some embodiments, at least some of the components of the mold assembly 200 will comprise a metal alloy. The resonator 208 itself may comprise a polymer that is selected for its operating characteristics, cost, ability to be easily injection molded, and compatibility with adjacent parts (e.g., air intakes or bottom panels).

What is claimed is:

1. A method comprising:
   providing a mold cavity to produce an outer contour of an acoustic resonator;
   providing a mold core to produce an inner contour of the resonator, the inner contour corresponding to a plenum, and a connecting channel in fluid communication with the plenum;
   providing an insert fitting adjacent to the mold core that, during injection molding of the resonator, defines a length of the connecting channel;
   placing a quantity of potting compound adjacent to the mold core to alter the plenum volume; and
   injection molding the acoustic resonator using the mold cavity, mold core, potting compound, and insert.

2. The method of claim 1, wherein the inner contour of the resonator also corresponds to an air intake portion forming part of an air intake path.

3. The method of claim 2, wherein at least a portion of the connecting channel runs immediately adjacent to the air intake portion.

4. The method of claim 3, further comprising injection molding the resonator and installing it into an air intake path such that the connecting channel and the portion of an air intake path run adjacent to one another above a port between the two.

5. The method of claim 1, further comprising closing the resonator with a flat panel.

6. The method of claim 1, further comprising closing the resonator with a contoured panel.

7. A method comprising;
   providing a mold cavity, a mold core, and a mold insert that together define a part impression corresponding an integrated acoustic resonator, the integrated acoustic resonator having:
      a portion of an air intake;
      a plenum; and
      a connecting channel in fluid communication with portion of the connecting channel and the plenum; and
   injection molding the integrated acoustic resonator with the mold insert adjacent to the mold core to define a length and location of the connecting channel;
   wherein a resonant frequency of the integrated acoustic resonator is selected by adjusting a length of the mold insert corresponding to the length of the connecting channel; and
   wherein a volume of the plenum is at least partially defined by a quantity of potting compound interposing the mold cavity and mold core.

8. The method of claim 7, wherein at least a portion of the connecting channel runs parallel to the pair intake portion.

9. The method of claim 8, further comprising installing the integrated acoustic resonator into an air intake path such that a port defined between the connecting channel and the portion of an air intake is situated such that the connecting channel proceeds upwardly from the connection.

10. The method of claim 7, further comprising sealing a flat panel to the integrated acoustic resonator.

11. The method of claim 7, further comprising sealing a contoured panel to the integrated acoustic resonator.

12. A method comprising:
   injection molding a plenum of an integrated resonator between a mold cavity and a mold core;
   injection molding a portion of an air intake path between the mold cavity and the mold core as a component of the integrated resonator; and
   injection molding a connecting channel between the mold cavity and a mold insert adjacent to the mold core, as a component of the integrated resonator, the connecting channel providing fluid communication between the plenum and the air intake portion;
   wherein a quantity of filler is used during injection molding to reduce a volume of the plenum.

13. The method of claim 12, further comprising arranging the air intake path portion and the connecting channel to run at least partially parallel to one another from a common opening between the two.

14. The method of claim 13, further comprising installing the integrated resonator into an air intake path of a machine such that the common opening between the air intake path portion and the connecting channel is below where the air intake path portion and the connecting channel run parallel to one another.

15. The method of claim 12, further comprising sealing the air intake portion, the plenum, and the connecting channel with a flat panel.

16. The method of claim 12, further comprising sealing the air intake portion, the plenum, and the connecting channel with a contoured panel.

* * * * *